$$\varepsilon_o = \frac{\varepsilon_1+\varepsilon_2}{2} + \frac{\varepsilon_1-\varepsilon_2}{2}\cos 2\varphi_o \qquad (1)$$

$$\varepsilon_{+\varphi} = \frac{\varepsilon_1+\varepsilon_2}{2} + \frac{\varepsilon_1-\varepsilon_2}{2}\cos 2(\varphi_o+\varphi) \qquad (2)$$

$$\varepsilon_{-\varphi} = \frac{\varepsilon_1+\varepsilon_2}{2} + \frac{\varepsilon_1-\varepsilon_2}{2}\cos 2(\varphi_o-\varphi) \qquad (3)$$

$$\varepsilon_{red} = \frac{1}{E}\sqrt{\sigma_1^2+\sigma_2^2-\sigma_1\sigma_2} \qquad (4)$$

$$\sigma_1 = \frac{E}{1-\mu^2}(\varepsilon_1^2+\mu\varepsilon_2) \qquad (5)$$

$$\sigma_2 = \frac{E}{1-\mu^2}(\varepsilon_2+\mu\varepsilon_1) \qquad (6)$$

Fig. 1

$$tg\,2\varphi o = \frac{\varepsilon_{-\varphi} - \varepsilon_{+\varphi}}{2\varepsilon o - \varepsilon_{+\varphi} - \varepsilon_{-\varphi}}\, tg\varphi \quad (7)$$

$$\varepsilon_1 = \frac{\varepsilon_{+\varphi} + \varepsilon_{-\varphi} - 2\varepsilon o \cos 2\varphi}{4\sin^2\varphi} + \sqrt{\frac{(2\varepsilon o - \varepsilon_{+\varphi} - \varepsilon_{-\varphi})^2 + (\varepsilon_{-\varphi} - \varepsilon_{+\varphi})^2 tg^2\varphi}{16\sin^4\varphi}} \quad (8)$$

$$\varepsilon_2 = \frac{\varepsilon_{+\varphi} + \varepsilon_{-\varphi} - 2\varepsilon o \cos 2\varphi}{4\sin^2\varphi} - \sqrt{\frac{(2\varepsilon o - \varepsilon_{+\varphi} - \varepsilon_{-\varphi})^2 + (\varepsilon_{-\varphi} - \varepsilon_{+\varphi})^2 tg^2\varphi}{16\sin^4\varphi}} \quad (9)$$

$$\varepsilon red = \sqrt{\frac{1}{(1-\mu)^2}\left[\frac{\varepsilon_{+\varphi} + \varepsilon_{-\varphi} - 2\varepsilon o \cos 2\varphi}{4\sin^2\varphi}\right]^2 + \frac{3}{(1+\mu)^2} \cdot \frac{(2\varepsilon o - \varepsilon_{+\varphi} - \varepsilon_{-\varphi})^2 + (\varepsilon_{-\varphi} - \varepsilon_{+\varphi})^2 tg^2\varphi}{16\sin^4\varphi}} \quad (10)$$

Fig. 2

3,495,079

APPARATUS FOR DETERMINING THE STRESSES IN A STRUCTURE DUE TO STATIC AND DYNAMIC LOADING THEREOF

Janusz Halawa, Ul. Norwida 26/4, and Ewald Macha, Ul. Modrzewskiego 24, both of Wroclaw, Poland Filed May 4, 1966, Ser. No. 547,516
Claims priority, application Poland, May 8, 1965, P 108,727
Int. Cl. G06g 7/32
U.S. Cl. 235—193 7 Claims

ABSTRACT OF THE DISCLOSURE

An analogue computer is connected to the outputs of strain gages attached to a structure to be tested, in order to convert the voltages from said gages which correspond to the measured strains at a point in the structure, to the principal strains and transformation angle at said point. At the outputs of the analogue computer may be connected a recording device or an indicator for registering the voltages at said output.

The invention relates to a device designed to compute stresses from the extensometric data obtained at the measurement of static and dynamic strains.

Computations of extensometric data as made hitherto were based on the conventional calculation methods, and in the case of static measurements they were carried out by means of digital computers.

Imperfections encountered while using the earlier methods of calculating the extensometric test data consisted chiefly in the necessity of recording these data; in making the time-consuming calculations of the recorded output data, and in the limitations in using digital computers for these calculations.

The device according to this invention permits computations to be carried out immediately and simultaneously with the measurement of voltage values constituting the electric transformation of strains i.e., simultaneous calculation of both static and dynamic test data without the necessity to record the test data. Exensometric bridges are used for the plastic strain measurements and the outputs are fed to the computer which directly and continuously supplies the results.

Figure 3:
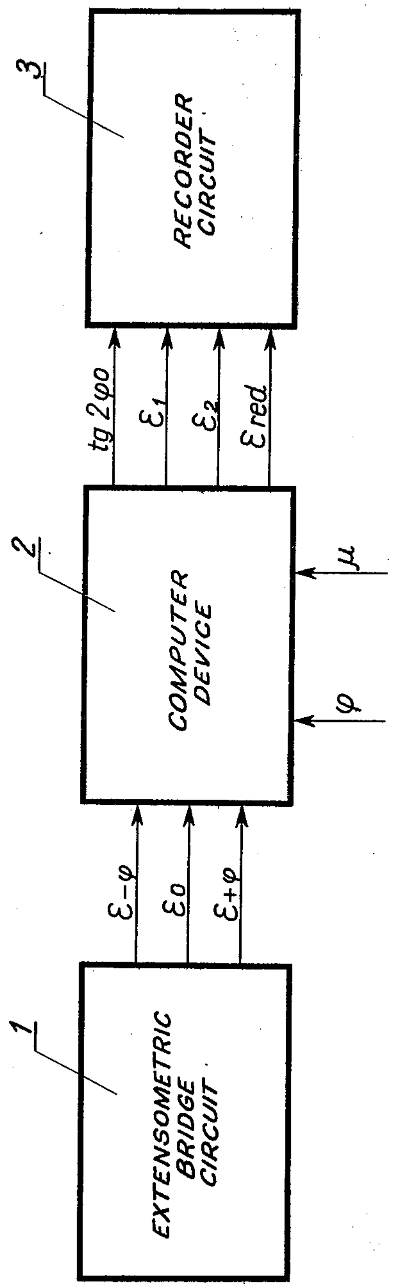
Figure 4:
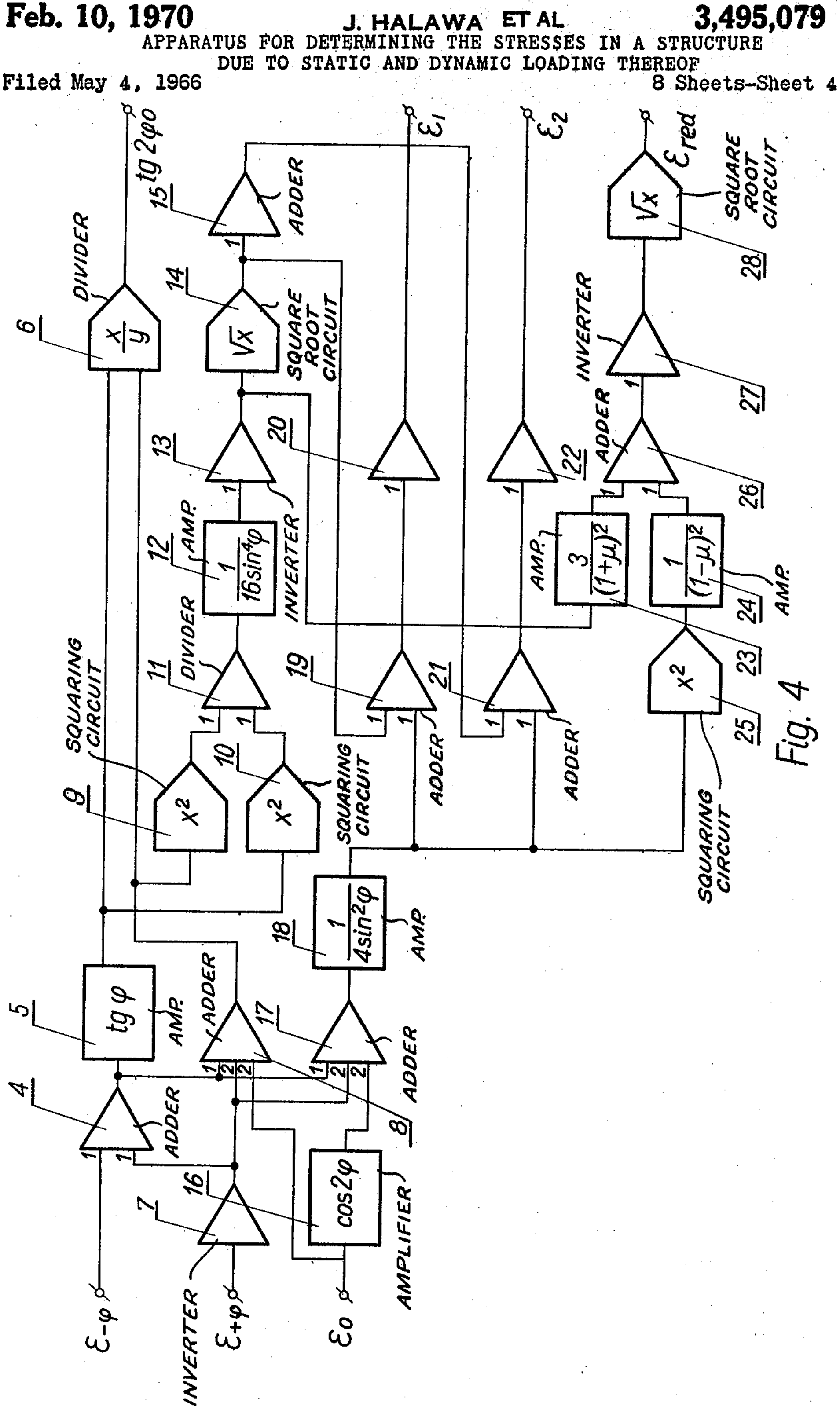

The invention will next be described in detail with reference to the appended drawing, wherein:

FIG. 1 shows six equations representing conditions of strain in a stressed body, FIG. 2 shows four equations suitable for analogue solution of the equations of FIG. 1, FIG. 3 is a block diagram showing the general arrangement of the circuit for computing strain values from extensometric data, FIG. 4 is a schematic diagram of the computing device of the circuit of FIG. 3, and FIGS. 5–8 show the relevant operative portions of the circuit of FIG. 3 for obtaining respective strain parameters.

The purpose of the device according to the invention is to modify the voltage values, using formulas as shown in FIG. 2, i.e. Formulae 7, 8, 9, 10 representing a solution to equations describing the conditions of strain in FIG. 1, i.e., Equations 1, 2, 3, 4, 5, 6.

The block diagram of the measuring and recording circuit, including the device designed to compute the extensometric data obtained at the measurement of static and dynamic strains, is shown in FIG. 3. Input quantities for the computing device 2 represent the components of the strain condition $$\epsilon_{-\varphi},\ \epsilon_{+\varphi},\ \epsilon_0$$

to be obtained from the extensometric measuring bridge circuit 1 in the form of electric voltages. Quantities $\varphi$ and $\mu$ refer to one measurement and to one material only (the strain of which is to be determined), they are constant and are preset manually before starting calculations by means of suitable switches.

Output quantities with regard to the computing device are: $tg2\varphi_0$, $\epsilon_1$, $\epsilon_2$, $\epsilon_{red}$, in the form of electric voltages to be read from electric indicators, or to be recorded by circuit 3 designed to record results of computations.

One of the many possible embodiments of the computing device according to this invention is shown in FIG. 4.

Therein is shown a functional diagram of the analogue structure of a computing device incorporating operating numbers used in analogue computation technique.

The input quantities are in this case the electric voltages proportional to the magnitude $$\epsilon_{-\varphi},\ \epsilon_{+\varphi},\ \epsilon_0$$

Similarly, the output quantities are the electric voltages proportional to the magnitude $tg2\varphi_0$, $\epsilon_1$, $\epsilon_2$, $\epsilon_{red}$. The input quantity $$\epsilon_{+\varphi}$$

after passing through inverter 7, which changes its sign, is applied to the adder 4, adder 8 and to adder 17. Adder 4 adds the input quantity $$\epsilon_{-\varphi}$$

and the quantity $$-\epsilon_{+\varphi}$$

with coefficients 1 producing at the output the following expression:

$$-(\epsilon_{-\varphi}-\epsilon_{+\varphi})$$

The negative sign before the bracket is obtained from the adder which reverses the sign. Voltage corresponding to this expression is fed to the input of the function resistance generator or amplifier 5 realizing the function $tg\varphi$, to the adder input 8, and to the added input 17. At the function-generator output 5 the following expression is obtained:

$$-(\epsilon_{-\varphi}-\epsilon_{+\varphi})tg\varphi$$

which is then applied in the capacity of a numerator to the input of the dividing circuit 6 and to the squaring circuit 10. The input quantity $\epsilon_0$ is applied to the function resistance-generator 16 accomplishing the function cos $2\varphi$, and to the input of adder 8. The adder 8, by summing up the output quantity of the adder 4 with the coefficient 1, the output quantity of inverter 7 with the coefficient 2, as well as the input quantity $\epsilon_0$ with the coefficient 2, provides at the output the following expression:

$$-(2\epsilon_0-\epsilon_{-\varphi}-\epsilon_{+\varphi})$$

This expression is fed to the squaring circuit 9, and to the dividing circuit 6, as denominator. And so, there is obtained at the output of the dividing circuit 6 the accomplishment of the Formula 7, FIG. 2, corresponding to the output value $tg2\varphi_0$.

$$tg2\varphi_0=\frac{\epsilon_{-\varphi}-\epsilon_{+\varphi}}{2\epsilon_0-\epsilon_{-\varphi}-\epsilon_{+\varphi}}tg\varphi$$

The following expression after squarer 9

$$(2\epsilon_0-\epsilon_{-\varphi}-\epsilon_{+\varphi})^2$$

and the following expression after squarer 10:

$$(\epsilon_{-\varphi}-\epsilon_{+\varphi})^2tg^2\varphi$$

are applied to the adder 11. Adder 11 adds both last expressions and coefficients 1, and provides at the output the following expression:

$$-[(2\epsilon_0-\epsilon_{-\varphi}-\epsilon_{+\varphi})^2+(\epsilon_{-\varphi}-\epsilon_{+\varphi})^2tg^2\varphi]$$

which is applied to the input of the function resistance-generator 12 fulfilling the function $$1/16\sin^4\varphi$$

At the output of the function-generator 12 the following expression is obtained:

$$-\frac{[(2\epsilon_0-\epsilon_{-\varphi}-\epsilon_{+\varphi})^2+(\epsilon_{-\varphi}-\epsilon_{+\varphi})^2tg^2\varphi]}{16\sin^4\varphi}$$

which is applied to the inverter 13 in order to reverse the sign. The output expression from inverter 13 is applied further to the rooting circuit 14 and to the resistance function-generator 23 fulfilling the function:

$$3/(1+\mu)^2$$

The following expression from the rooting circuit 14

$$\sqrt{\frac{[(2\epsilon_0-\epsilon_{-\varphi}-\epsilon_{+\varphi})^2+(\epsilon_{-\varphi}-\epsilon_{+\varphi})^2tg^2\varphi}{16\sin^4\varphi}}$$

is applied at the input of the adder 19 and inverter 15, which after reversing the sign of this expression feeds it to the output of adder 21.

is applied to the function resistance-generator 24, fulfilling the function:

$$1/(1-\mu)^2$$

Adder 26 adds the following output expression fed by the function generator 23:

$$\frac{3}{(1+\mu)^2}\,\frac{2\epsilon_0-\epsilon_{-\varphi}-\epsilon_{+\varphi})^2+(\epsilon_{-\varphi}-\epsilon_{+\varphi})^2tg^2\varphi}{16\sin^4\varphi}$$

and the following output expression obtained from function generator 24

$$\frac{1}{(1-\mu)^2}\left(\frac{\epsilon_{+\varphi}+\epsilon_{-\varphi}-2\epsilon_0\cos 2\varphi}{4\sin^2\varphi}\right)^2$$

to coefficient 1 to provide at the output the following expression:

$$-\left[\frac{1}{(1-\mu)^2}\left(\frac{\epsilon_{+\varphi}+\epsilon_{-\varphi}-2\epsilon_0\cos 2\varphi}{4\sin^2\varphi}\right)^2+\frac{3}{(1+\mu)^2}\,\frac{(2\epsilon_0-\epsilon_{-\varphi}-\epsilon_{+\varphi})^2+(\epsilon_{-\varphi}-\epsilon_{+\varphi})^2tg^2\varphi}{16\sin^2\varphi}\right]$$

which after being fed through inverter 27 and changing its sign, is applied to the rooting circuit 28. At the output of the rooting circuit 28, the following expression is produced $$\sqrt{\frac{1}{(1-\mu)^2}\left(\frac{\epsilon_{+\varphi}+\epsilon_{-\varphi}-2\epsilon_0\cos 2\varphi}{4\sin^2\varphi}\right)+\frac{3}{(1+\mu)^2}\,\frac{(2\epsilon_0-\epsilon_{-\varphi}-\epsilon_{+\varphi})^2+(\epsilon_{-\varphi}-\epsilon_{+\varphi})^2tg^2\varphi}{16\sin^4\varphi}}$$

At the output of the function-generator 16, the expression $\epsilon_0\cos 2\varphi$ is obtained to be fed further to the adder 17 input. Adder 17 adds the output quantity of the adder 4 and the coefficient 1, the output quantity of inverter 7 and coefficient 2, and the output quantity from function generator 16 and coefficient 2, providing the following expression at the output:

$$\epsilon_{+\varphi}+\epsilon_{-\varphi}-2\epsilon_0\cos 2\varphi$$

The above expression is fed to the function resistance-generator 18, thus accomplishing the function:

$$1/4\sin^2\varphi$$

The following expression from the function generator 18

$$\frac{\epsilon_{+\varphi}-\epsilon_{-\varphi}-2\epsilon_0\cos 2\varphi}{4\sin^2\varphi}$$

is fed to the adder 19, adder 21, and to the squaring circuit 25. Adder 19 sums up the output quantity obtained from the rooting circuit 14 and the output quantity from the function generator 18 and coefficients 1, in order to provide the following expression at the output $$\left[\frac{\epsilon_{+\varphi}+\epsilon_{-\varphi}-2\epsilon_0\cos 2\varphi}{4\sin^2\varphi}+\sqrt{\frac{(2\epsilon_0-\epsilon_{-\varphi}-\epsilon_{+\varphi})^2+(\epsilon_{-\varphi}-\epsilon_{+\varphi})tg^2\varphi}{16\sin^4\varphi}}\right]$$

which after passing through inverter 20 and after reversal of sign represents the fulfillment of the output quantity $\epsilon_1$ according to Formula 8, FIG. 2. Adder 21 sums up the output quantity from inverter 15 and the output quantity from the function generator 18 and coefficients 1 to give the following expression at the output:

$$\left[\frac{\epsilon_{+\varphi}+\epsilon_{-\varphi}-2\epsilon_0\cos 2\varphi}{4\sin^2\varphi}-\sqrt{\frac{(2\epsilon_0-\epsilon_{-\varphi}-\epsilon_{+\varphi})^2+(\epsilon_{-\varphi}-\epsilon_{+\varphi})^2tg^2\varphi}{16\sin^4\varphi}}\right]$$

which after passing through inverter 22 and changing the sign accomplishes the output quantity $\epsilon_2$ according to Formula 9, FIG. 2. The following expression after squarer 25:

$$\left[\frac{\epsilon_{+\varphi}+\epsilon_{-\varphi}-2\epsilon_0\cos 2\varphi}{4\sin^2\varphi}\right]^2$$

which is the fulfillment of the output quantity $\epsilon_{red}$ according to Formula 10, FIG. 2. All the $\varphi$-angle-function resistance-generators are changed by aid of one switch simultaneously. The same refers to the resistance generators for the quantity "$\mu$" function.

Figure 5:
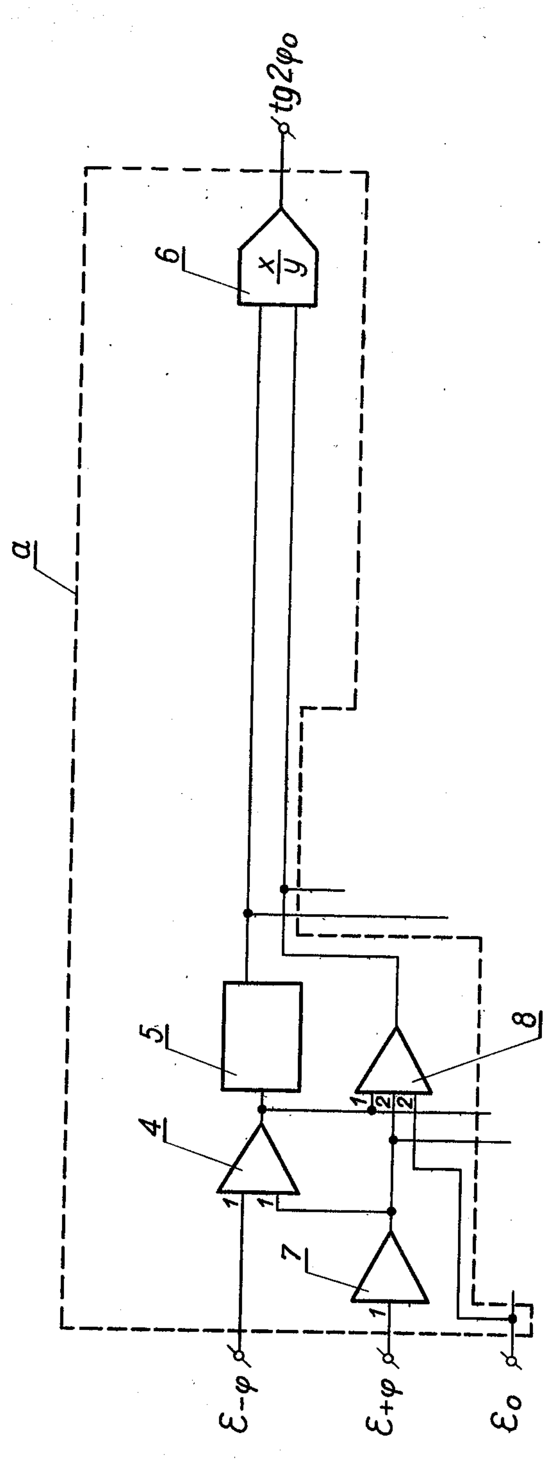

Under the above analogue structure, it is possible to distinguish the following four computation circuits *a*, *b*, *c*, *d* as follows:

(I) Circuit *a*, FIG. 5, for the computation of the double-transformation-angle-tangent function defined by the Formula 7, FIG. 2, composed of the following elements: inverter 7, adder 4, adder 8, function resistance-generator 5 and dividing circuit 6.

Figure 6:
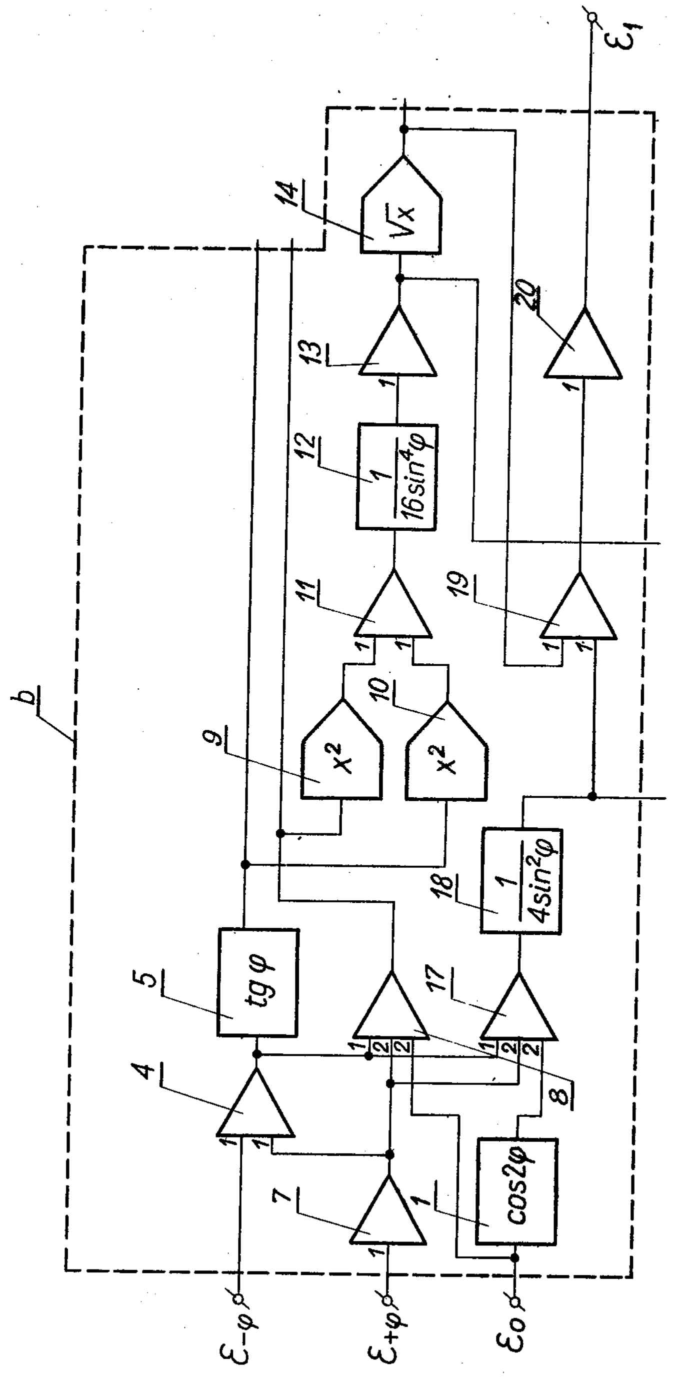

(II) Circuit *b*, FIG. 6, for the computation of the maximum strain defined by Formula 8, FIG. 2, composed of the following elements: inverter 7, adder 4, adder 8, function resistance-generator 5, function resistance-generator 18, squarer 9, squarer 10, adder 11, function resistance-generator 12, inverter 13, rooting circuit 14, adder 19 and inverter 20.

Figure 7:
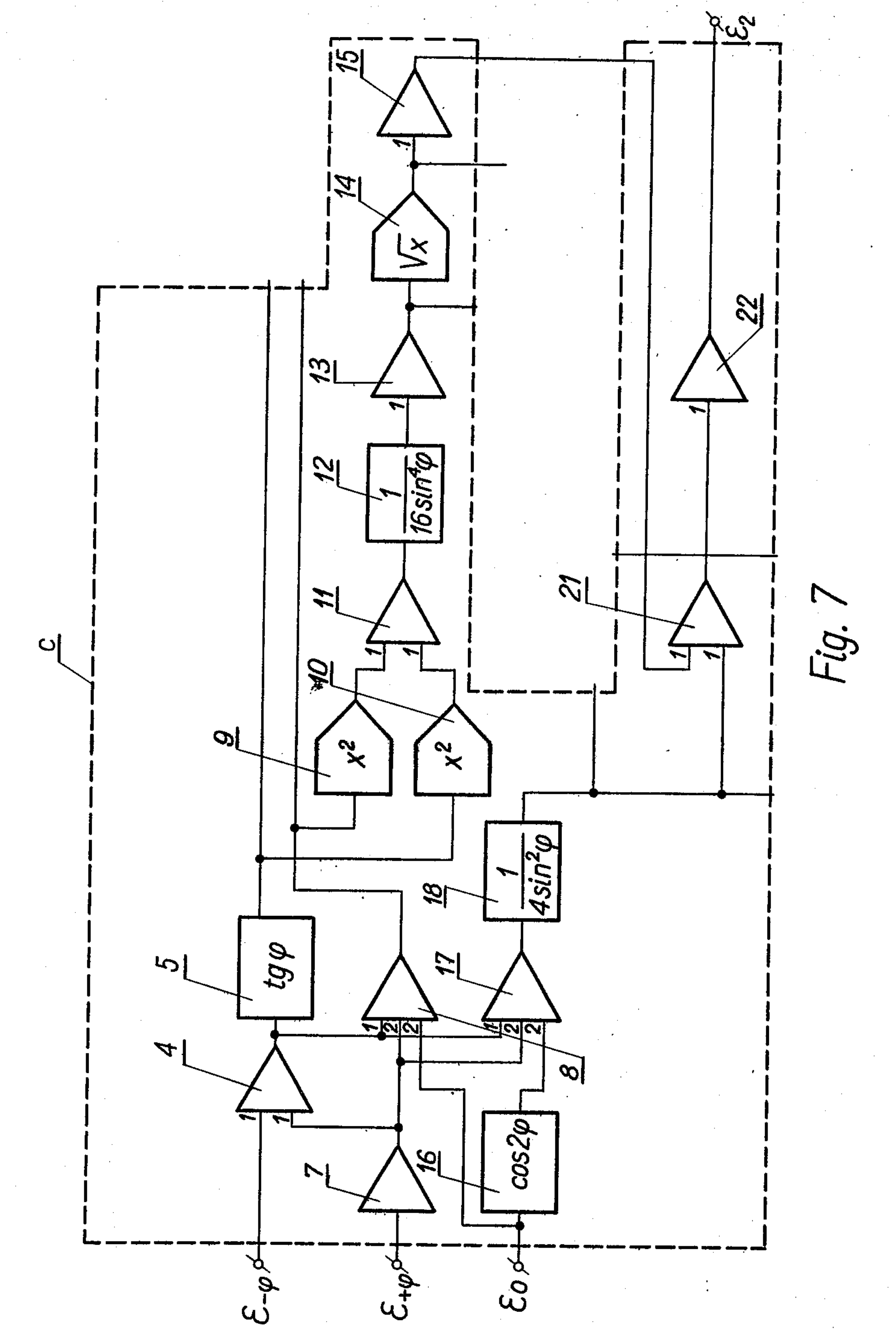

(III) Circuit *c*, FIG. 7, for the computation of the minimum strain defined by Formula 9, FIG. 2, incorporating the following elements: inverter 7, adder 4, adder 8, function resistance-generator 5, function resistance-generator 16, adder 17, function resistance-generator 18, squarer 9, squarer 10, adder 11, function resistance-generator 12, inverter 13, rooting circuit 14, inverter 15, adder 21, and inverter 22.

Figure 8:
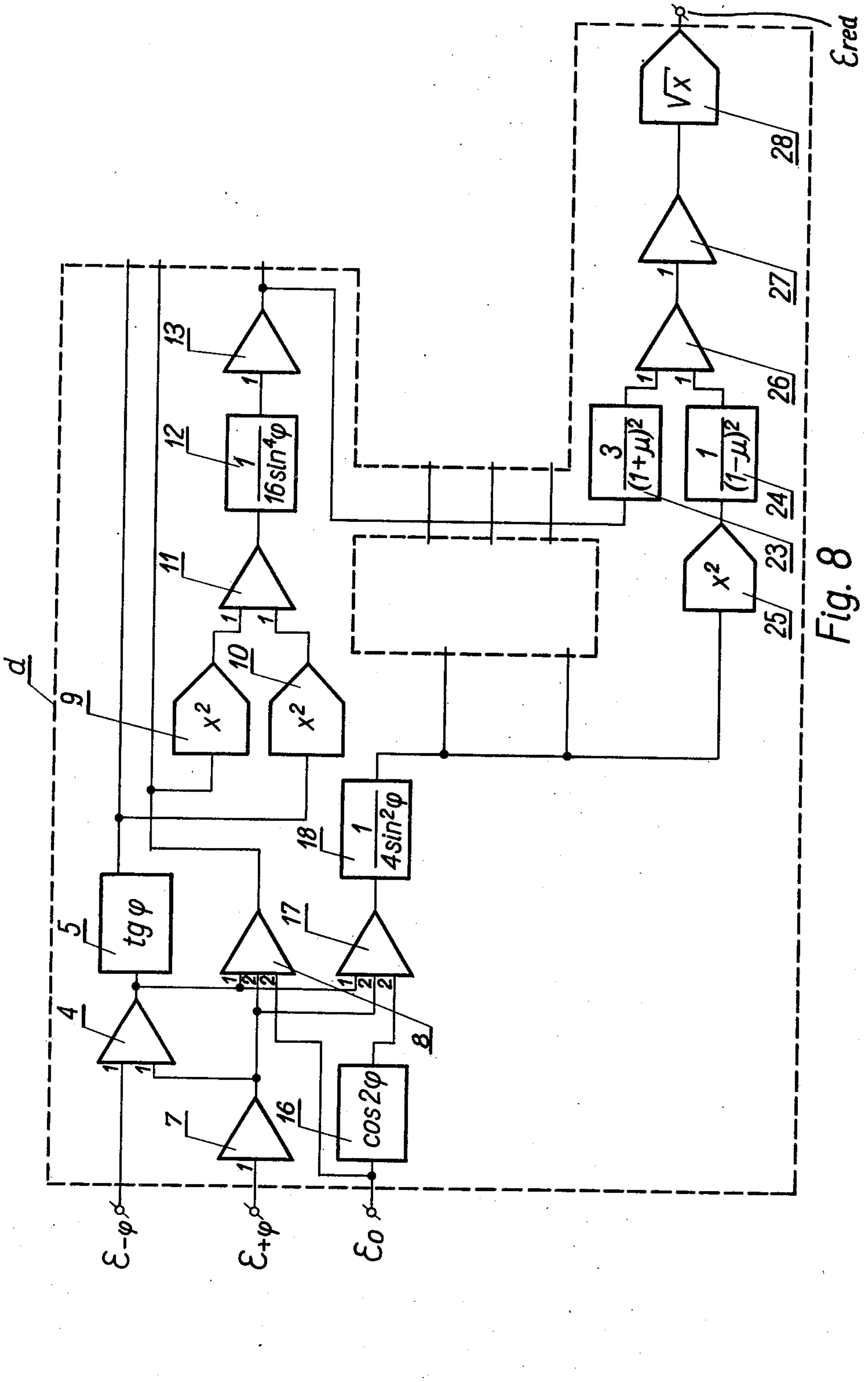

IV Circuit *d*, FIG. 8, for the computation of reduced strain defined by Formula 10, FIG. 2, incorporating the following elements: inverter 7, added 4, adder 8, function resistance-generator 5, function resistance-generator 16, adder 17, function resistance-generator 18, squarer 9, squarer 10, adder 11, function resistance-generator 12, inverter 13, function resistance-generator 23, squarer 25, function resistance-generator 24, adder 26, inverter 27, and rooting circuit 28.

As it may be easily seen some of the elements are common for more than one circuit. Such a mutual interconnection of circuits, as shown in FIG. 4, resulting from the incorporation of the same elements in more than one circuit aims at reducing the number of elements in the analogue circuit.

We claim:

1. Apparatus for determining the stresses in a structure due to static and dynamic loading thereof, said apparatus comprising strain gages applied to the structure being tested to furnish respective output voltages corresponding to the measured strains in the structure at a point thereof, analogue computer means coupled to said gages to receive the output voltages therefrom for operating thereon to produce directly output voltages corresponding respectively to the principal strains and the transformation angle, and means coupled to said outputs of the analogue computer for registering the voltages thereat.

2. Apparatus as claimed in claim 1 wherein said strain gages are arranged to provide three voltage outputs corresponding to the triaxial strains at said point in the structure, said output voltages from the analogue computer means being four in number and corresponding to the maximum principal strain, the minimum principal strain, the reduced strain and the transformation angle.

3. Apparatus as claimed in claim 2 wherein said analogue computer means comprises four computation circuits consisting of a first circuit *a* for computing the trigonometric function of the transformation angle tangent $2\omega_0$, a second circuit *b* for computing the maximum principal strain $\epsilon_1$, a third circuit *c* for computing the minimum principal strain $\epsilon_2$, and a fourth circuit *d* for computing the reduced strain $\epsilon_{red}$.

4. Apparatus as claimed in claim 3 wherein the outputs of said strain gages are $\epsilon_\varphi$, $\epsilon_{-\varphi}$ and $\epsilon_0$ and wherein the circuit *a* includes and has the $\epsilon_\varphi$ output connected to an adder 4 input, the $\epsilon_{+\varphi}$ output connected to an inverter 7 input, the $\epsilon_0$ output connected to an adder 8 input, the inverter 7 output, being connected to the adder 4 input and the adder 8 input, the adder 4 output being connected to an amplifier 5 input and the adder 8 input, the adder 8 output being connected to a dividing circuit denominator input 6, and the amplifier 5 output being connected to the dividing circuit numerator input 6, the dividing circuit 6 output furnishing a measure of the transformation angle.

5. Apparatus as claimed in claim 3 wherein the outputs of said strain gages are $\epsilon_\varphi$, $\epsilon_{-\varphi}$ and $\epsilon_0$ and wherein the circuit *b* includes and has the $\epsilon_{-\varphi}$ output connected to an adder 4 input, the $\epsilon_{+\varphi}$ output connected to an inverter 7 input, the $\epsilon_0$ signal output connected to an adder 8 input and an amplifier 16 input, the inverter 7 output being connected to the adder 4 input, the adder 8 input, and an adder 17 input; the adder 4 output being connected to the amplifier 5 input, adder 8 input, and adder 17 input; an amplifier 16 output being connected to the adder 17 input, the amplifier 5 output being connected to the input of a squarer 10, adder 8 output being connected to the input of a squarer 9, the outputs of squarers 9 and 10 being connected to an adder 11 input, the output of adder 11 being connected to an amplifier 12 input, the amplifier 12 output being connected to an input of inverter 13, the inverter 13 output being connected to the input of a square root circuit 14, the circuit 14 output being connected to the input of an adder 19, the adder 17 output being connected to the input of the amplifier 18, the output of amplifier 18 being connected to the input of an adder 19, the adder 19 output being connected to an inverter 20 input, the output from inverter 20 furnishing a measure of the maximum principal strain.

6. Apparatus as claimed in claim 3 wherein the outputs of said strain gages are $$\epsilon_\varphi,\ \epsilon_{-\varphi} \text{ and } \epsilon_0$$

and wherein the circuit *c* includes and has the $$\epsilon_{-\varphi}$$

output is connected to the input of an adder 4, the $$\epsilon_{+\varphi}$$

output is connected to an inverter 7 input, the $\epsilon_0$ output being connected to an adder 8 input and to an amplifier 16 input, the output of inverter 7 being connected to the input of adder 4, as well as adder 8 input and the input of an adder 17; the output of adder 4 being connected to the input of an amplifier 5 input, as well as adder 8 input and adder 17 input, the output of the amplifier 16 being connected to the adder 17 input, the output of the amplifier 5 being connected to a squarer 10 input, the output of adder 8 being connected to a squarer 9 input, the outputs of squarers 9 and 10 being connected to an adder 11 input, the adder 11 output being connected to an amplifier 12 input, the output of amplifier 12 being connected to an inverter 13 input, the output of inverter 13 being connected to a square root circuit 14 input, the output of the circuit 14 being connected to an inverter 15 input, the output of inverter 15 being connected to an adder 21 input, the adder 17 output being connected to an amplifier 18 input, the output of amplifier 18 being connected to an adder 21 input, the output of adder 21 being connected to an inverter 22 input, the output of inverter 22 being a measure of the minimum principal strain.

7. Apparatus as claimed in claim 3 wherein the outputs of said strain gages are $$\epsilon_\varphi,\ \epsilon_{-\varphi} \text{ and } \epsilon_0$$

and wherein the circuit *d* includes and has the $$\epsilon_{-\varphi}$$

output is connected to the input of an adder 4, the $$\epsilon_{+\varphi}$$

output is connected to the input of an inverter 7, the $\epsilon_0$ output is connected to the inputs of an adder 8 and an amplifier 16; the output of inverter 7 is connected to the adder 4 input, as well as the inputs of adder 8 and an adder 17; the adder 4 output being connected to an amplifier 5 input, as well as to the inputs of adder 8 and adder 17, an amplifier 16 output being connected to the adder 17 input, the output of the amplifier 5 being connected to a squarer 10 input, the adder 8 output being connected to a squarer 9 input, the outputs of squarers 9 and 10 being connected to an adder 11 input, the adder 11 output being connected to an amplifier 12 input, the amplifier 12 output being connected to an inverter 13 input, the inverter 13 output being connected to an amplifier 23 input, the adder 17 output being connected to the input of an amplifier 18, the amplifier 18 output being connected to a squarer 25 input, the output of squarer 25 being connected to an amplifier 24 input, the outputs of amplifiers 23 and 24 being connected to an adder 26 input, the adder 26 output being connected to an inverter 27 input, the inverter 27 output being connected to a square root circuit 28 input, the output of circuit 28 output being a measure of the reduced strain.

References Cited

UNITED STATES PATENTS 3,324,287 6/1967 Fetterman et al. ------ 235—194

MALCOLM A. MORRISON, Primary Examiner

J. F. RUGGIERO, Assistant Examiner

U.S. Cl. X.R.

235—151.3